March 25, 1952  V. I. DUDLEY  2,590,300
VEHICLE STEERING MECHANISM
Filed Nov. 6, 1948  3 Sheets-Sheet 3

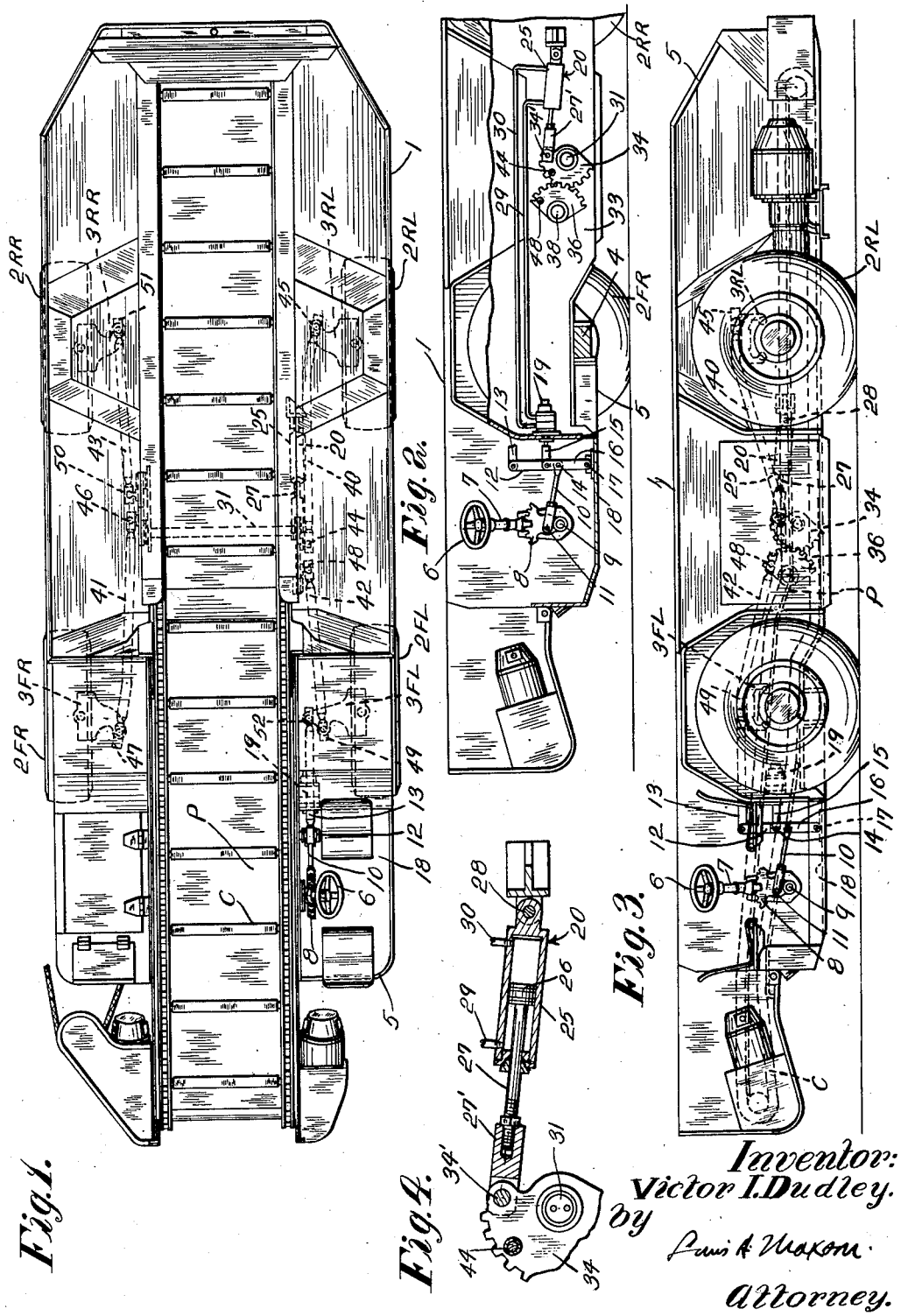

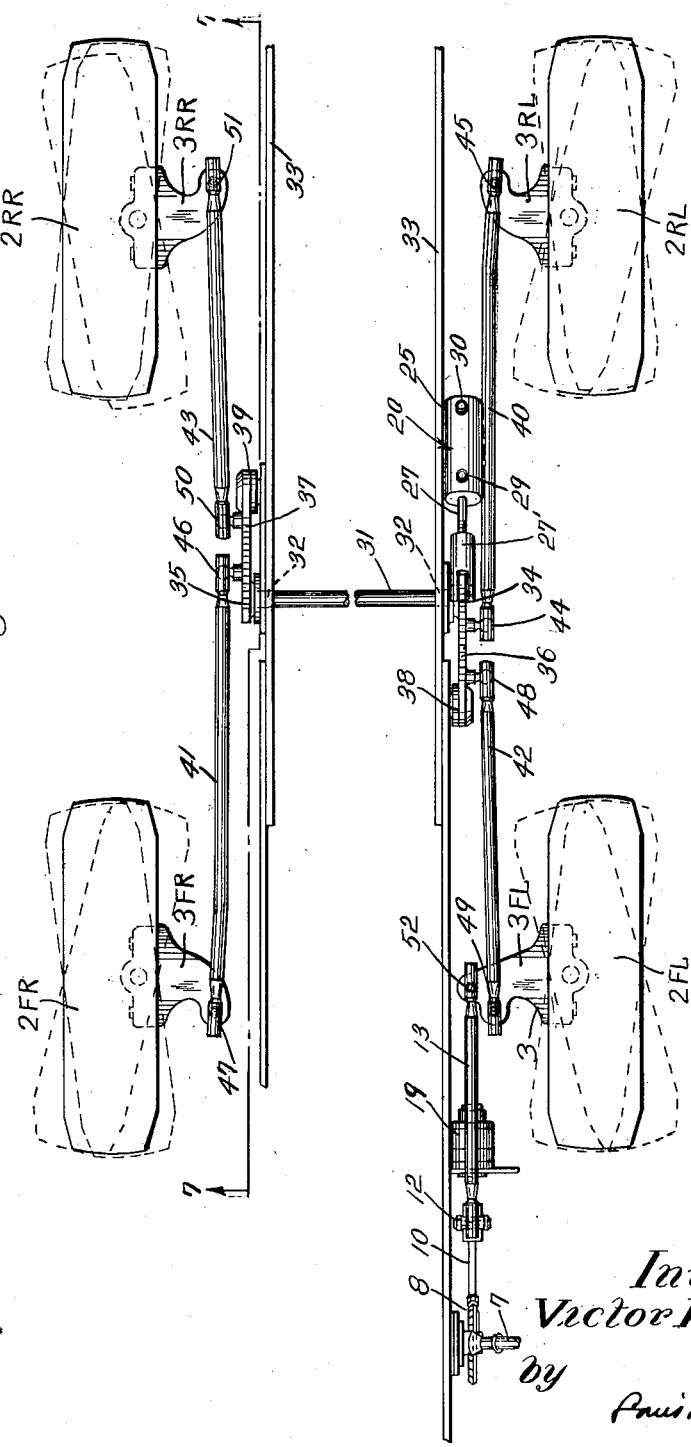

Inventor:
Victor I. Dudley.
by
Paul A. Maxom.
Attorney.

Patented Mar. 25, 1952

2,590,300

UNITED STATES PATENT OFFICE 2,590,300

VEHICLE STEERING MECHANISM

Victor I. Dudley, Franklin, Pa., assignor to Joy Manufacturing Company, Pittsburgh, Pa., a corporation of Pennsylvania Application November 6, 1948, Serial No. 58,713

22 Claims. (Cl. 280—91)

This invention relates to mechanism for steering self-propelled vehicles, and more particularly to improvements in steering mechanism for vehicles having front and rear sets of steerable wheels.

One of the principal objects of the invention is to provide an improved means for steering vehicles having front and rear sets of steerable wheels. Another object is to provide an improved steering mechanism for vehicles of the character mentioned in which tie rods between the front wheels and between the rear wheels are unnecessary. A further object is to provide an improved steering mechanism having front and rear sets of steerable wheels incorporating improved means for causing that pair of the front and rear wheels which is at the inside of a curved path to be followed by the vehicle to turn through a greater angle than the other pair of front and rear wheels. Another object is to provide improved steering mechanism for so adjusting the front and rear wheels of a vehicle that when the vehicle is being steered to effect turning on the shortest possible radius all of the wheels shall be so positioned that the lines of their axes of rotation shall intersect, when extended, a common vertical line, and desirably in a common point therein. Still another object of the invention is to provide an improved steering mechanism for vehicles having front and rear sets of steerable wheels providing for equal turning movements of the front and back wheels at the same side of the vehicle. Other objects and advantages of the invention will hereinafter more fully appear.

In the accompanying drawings, in which for purposes of illustration one embodiment which my invention may assume in practice has been shown, Fig. 1 is a top plan view of a self-propelled vehicle in which my invention is embodied in its illustrated form.

Fig. 2 is a partial side elevational view, with parts broken away, showing in simplified form a portion of the improved steering apparatus.

Fig. 3 is a side elevational view of the vehicle shown in Fig. 1.

Fig. 4 is an enlarged vertical sectional view showing the hydraulically operated cylinder and piston mechanism utilized in effecting power steering.

Fig. 5 is an enlarged schematic view showing the steering mechanism with practically all other parts omitted, the view being as it were a plan view of the steering mechanism.

Figure 6:
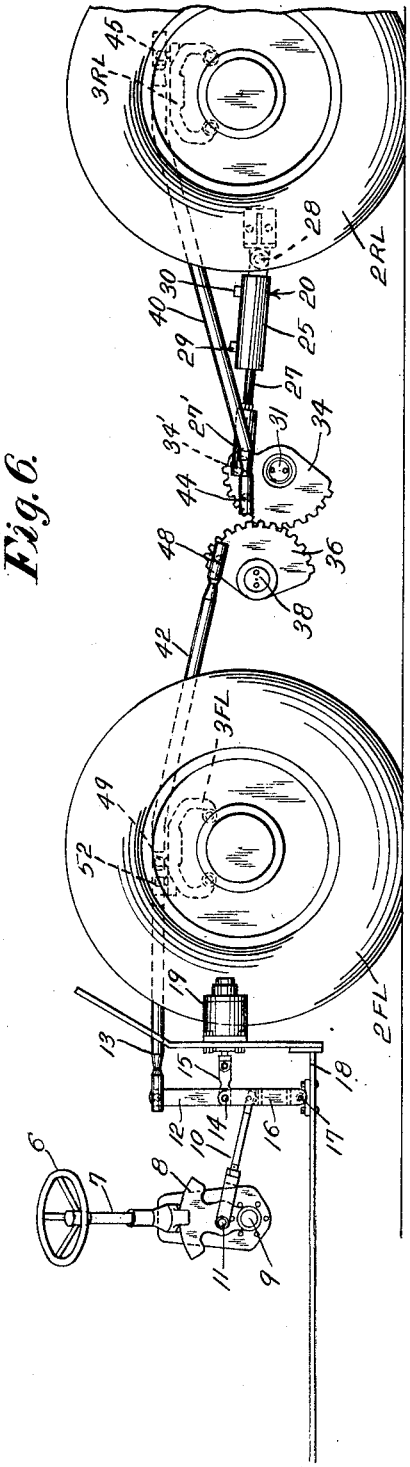
Fig. 6 is a view of the steering mechanism at the lower side of Fig. 5.
Figure 7:
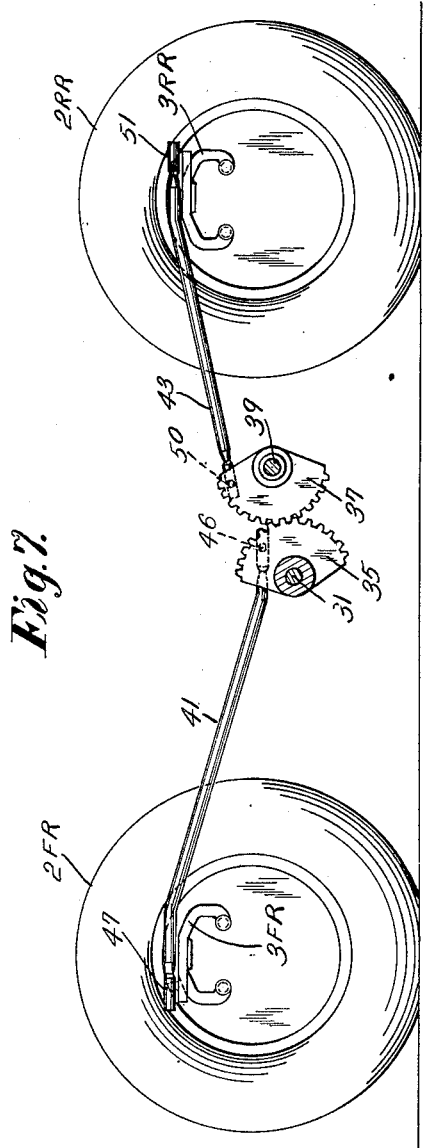
Fig. 7 is a vertical longitudinal section on the plane of the line 7—7 of Fig. 5.

Referring to the drawings, there will be noted in Fig. 1 a vehicle 1, herein shown in the form of a "shuttle car," supported on wheels 2FL and 2FR at its forward end and on wheels 2RL and 2RR at its rearward end. The letters respectively indicate: front left, front right, rear left and rear right. All of the wheels are steerable, and each is provided with a steering arm or yoke 3, the several steering arms or yokes being designated with the same letters as the wheels with which they are associated. The steering arms associated with the several wheels are each so constructed and arranged that they form the equivalents of levers arranged at angles to the vertical planes in which the axes of wheel rotation lie and each of which has its point of connection with an associated link, later described, nearer the more adjacent end of the vehicle than would be the case were the point of connection located in the vertical plane in which lies the axis of rotation of the wheel steered by such steering arm. The steerable wheels are mounted by means of axles, one of which is shown at 4, and which support the frame 5 of the vehicle.

Steering is under the control of steering wheel 6, mounted on a steering column 7 and by rack and pinion means adapted to turn a sector 8 about a horizontal axis 9. A link 10 is pivotally connected at one end, at 11, to the sector 8, and at its other end is pivotally connected to the lower end of a lever 12 whose upper end has connected to it a reach rod 13. The lever 12 is pivotally connected at 14 to one end of a connecting rod 15, and the lever 12 is pivotally supported by upstanding arms 16 pivotally mounted as at 17 on a plate 18 forming a portion of the vehicle frame. The connecting rod 15 is pivotally connected at its other end to the operating rod of a valve mechanism 19, the particular one shown being called a Bendix and consisting of a suitable reciprocable valve which is movable oppositely to distribute a hydraulic fluid, supplied by a pump not shown, selectively to the opposite ends of a steering servo-motor 20, and to vent fluid from such ends. The mechanism described has many of the characteristics of a steering engine, including the feature of a follow-up motion, and is well known in the art and in use on many "shuttle cars" of the manufacture of my assignee.

The steering servo-motor 20 provides power for the steering of all four wheels, and comprises a cylinder 25, a piston 26, and a piston rod 27, and has a pivotal mounting on the vehicle 1 at 28. Fluid supply and discharge conduits 29 and 30 lead to the opposite ends of the cylinder 25 from the Bendix or control valve mechanism.

Midway between the pairs of front and rear wheels there is a transversely extending shaft 31, rotatably supported at 32 in bearings carried by vehicle frame elements 33, 33. Gear sectors 34 and 35, generally oppositely facing, are fixed to the opposite ends of the shaft 31; and to the sector 34 there is pivotally connected at 34' a fork member 27' fixed to the outer end of the piston rod 27. The gear sector 34 faces generally forwardly, the sector 35 generally rearwardly, as shown. Downward swing of the sector 34 is attended by upward swing of the sector 35, and vice versa.

Meshing with the gear sector 34 is a gear sector 36, and meshing with the gear sector 35 is a gear sector 37. The gear sector 36 is pivotally supported as at 38 by the adjacent side frame 33, and its axis is, for reasons later explained, forward of and slightly above the axis of the cross shaft. The gear sector 37 is pivotally supported as at 39 by the frame 33 which is adjacent to it, and its pivot is above and to the rear of the axis of the cross shaft 31. This cross shaft passes beneath the plate P over which the flight conveyor C moves.

Each gear sector has connected to it a link or rod. Two of these rods are relatively long and two are relatively short.

The longer rods, which are pivotally connected to the gear sectors 34 and 35 carried on the cross shaft 31 are numbered 40 and 41. Those which are connected to the segments 36 and 37 are relatively short and are numbered 42 and 43. Rod 40 at its forward end is pivotally connected at 44 as by a ball connection to the sector 34, and at its rear end to a ball projection 45 on the steering bracket 3RL. Rod 41 at its rearward end is similarly pivotally connected at 46 to the sector 35, and at its forward end is connected to a ball projection 47 on the steering bracket 3FR. Rod 42 is similarly pivotally connected at 48 at its rearward end to the sector 36 and at its forward end to a ball projection 49 on the steering bracket or arm 3FL. Rod 43 is similarly pivotally connected at its forward end as at 50 to the sector 37 and at its rearward end to a ball projection 51 on the steering bracket 3RR. All of the connections of the several rods are by means of ball and socket devices, whereby changes in lateral and vertical positions are made possible. Each of the ball projections 45, 47, 49 and 51 is nearer, in the positions of the wheels for rectilinear vehicle movement, to the more adjacent end of the vehicle than the axis of rotation of the wheel whose steering it aids in effecting.

The reach rod 13 at its rearward end is connected by a ball and socket connection 52 to the steering arm 3FL.

The positions of the gear sectors shown in full lines are those which correspond to the mid-position of the piston 26 in its cylinder 25. When the piston is caused to move forwardly, steering to the right, considering forward vehicle movement, will be effected. When the piston 26 is moved rearwardly in its cylinder, steering to the left, considering forward vehicle movement, will be effected.

The pivot mountings 38 and 39 are higher than the bearings 32, 32, so that the angles to the horizontal of the shorter rods 42 and 43 may be reduced.

When the piston 26 is in mid-position in its cylinder, a radial line connecting its pivotal connection 34' with the sector 34 with the axis of the shaft 31 is at right angles to the axis of the piston rod extended. (See Fig. 4.) Thus the ranges of opposite arcuate movement, as the piston is moved to the opposite ends of its cylinder, are essentially the same. The location of the cross shaft 31 is determined by the fact that it is below the bottom plate P of the material carrying receptacle of the vehicle and that it may best be equidistant from the front and back wheels. As the longer links or rods 40, 41 are connected to the sectors 34 and 35 which are carried by the cross shaft, this lower position of the axis of turning of these sectors is not prejudicial, but in order that the angle of the shorter rods 42, 43 to the horizontal may not be excessive, it is preferred to have their pivotal mountings higher, in the manner shown and above described. When the pivotal connections of the rods with the sectors at either side of the vehicle are to be moved apart, it is desired that maximum turning of the wheels which these rods control be effected. Thus the ball pivots will be located on the sectors in the manner shown, namely, relatively near to a line extending from the pivots of their respective sectors perpendicularly to the line which connects the end pivots of their rods, so that, referring to Fig. 6, as the piston 26 moves forward in its cylinder 25 the right hand wheels will undergo maximum turning movement, the rear wheel counterclockwise in Fig. 5 and the front wheel clockwise in Fig. 5. Simultaneously, with respect to the left side of the vehicle looking forwardly, the ball pivots carried by the sectors 34 and 36 will be caused to approach each other, but, in view of the location of these pivots 44 and 48, while the wheels at the left hand side of the vehicle, looking forward will, in the case of the back wheel, be turned counterclockwise, and in the case of the front wheel clockwise, the angle of turning movement will be reduced. The ball pivots on the sectors are so located, it will be seen, that, while there is a much greater longitudinal rod movement when the pivot connections move apart than when they move together, the angles of arcuate movement of the sectors themselves will be the same, whether the piston of the servo-motor moves from its center position to its rearward position, or from its center position to its foremost position. The location of the pivotal connections will be so made that the axes of the several wheels extended will intersect in a common point when the steering mechanism is cramped "hard over" so as to effect turning on the shortest radius. Another factor that contributes to the accomplishment of the maximum turning of the wheels at the inside of curved paths is the location of the ball projections 45, 47, 49 and 51 as above described; and it will be noted that due to their locations relative to the steering arms or yokes 3 movements apart of the ball projections 47 and 51 (and of the projections 45 and 49) from their mid-positions, shown in full lines in Fig. 5, will produce a greater degree of wheel turning per unit of movement than will movements of approach of said ball projections. Thus the locations of the ball pivots on the sectors and of the ball projections on the steering arms will both contribute effectively to the desired greater angular movements of the "inside" wheels on curves.

From the foregoing description it will be apparent that I have provided an improved steering mechanism in which it is unnecessary to connect the front wheels with tie rods or the back wheels with tie rods; one in which a single cross connection extending transversely of the vehicle suffices for the effective control of the angling of all four steerable wheels; one in which the inner wheels have imparted to them greater turning movement than the outer wheels regardless of the direction of steering—whether from right to left or left to right; one in which an avoidance of excessive angles of the steering rods to the parts to which they are connected is effected; one in which the wheels may be turned through corresponding angles by like movements of the steering control device irrespective of the direction in which the vehicle is to be caused to turn; and one which is very simple, rugged, effective, and which may be power operated in a most advantageous manner. Obviously the pairs of coacting gear sectors are but representative of other mechanisms for connecting what may broadly be considered as crank arms for movement in mutually opposite directions. It will be observed that the illustrative embodiment of the invention includes four drag links connected to the four wheels of the vehicle by ball and socket joints; the drag links being shown as near to, and generally parallel to parallel vertical planes at, the sides of the vehicle frame, and extending towards the center of the vehicle and being pivoted on additional ball studs near the peripheries of the meshing gear element (shown for illustration as gear sectors). The drag links are pivotally connected to the gear elements at points in radial lines which incline towards each other when the vehicle wheels are in straight-away position, with the result that with the assistance of properly shaped steering arms the wheels will be turned in proper direction and through proper angles irrespective of the direction of steering, with proportions predetermined to provide for the precisely desired relative angles between the wheels when turning on the shortest possible radius is to be effected. By this arrangement tie rods between wheels may be dispensed with, which is very helpful when the road clearance is small. Very direct connections to each wheel are provided. Equal and positive motion for the wheels at the inside of a turn and also for the wheels at the outside of a turn is secured, and the axes of rotation of all of the wheels produced (or extended) intersect at least approximately—and quite exactly on very sharp turns—a common line. The structure lends itself well to hydraulic steering, with power application at either end of the common shaft 31, and is ideally adapted to independent wheel suspension.

In the appended claims the gear sectors are sometimes so specified, in other claims they are referred to as "gear elements," in others as "crank arm equivalents," and again they are simply designated as "crank arms," for such they truly are, though of special shape and performing additional functions.

While there is in this application specifically described one embodiment which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. Steering mechanism for a vehicle having front and rear sets of steerable wheels each having a steering arm connected thereto, comprising a transverse shaft carrying gear sectors fixed to rotate therewith and disposed one at each of the opposite sides of the longitudinal center line of the vehicle, other gear sectors pivotally supported on axes offset from the axis of said shaft but parallel thereto, at the opposite sides of the longitudinal center line of said vehicle and constantly meshing with said first mentioned gear sectors, means for effecting swinging of one of said gear sectors upon its axis, and rods each individual to a single steering arm and to a single gear sector connecting the several steering arms each with a separate gear sector whereby each gear sector controls the steering position of one wheel and the several sectors together control the steering positions of all of the wheels.

2. Steering mechanism for a vehicle having front and rear sets of steerable wheels each having a steering arm connected thereto, comprising a transverse shaft carrying gear sectors at the opposite sides of the longitudinal center line of the vehicle, gear sectors pivotally supported, on axes offset from the axis of said shaft, at the opposite sides of the longitudinal center line of said vehicle and meshing with said first mentioned gear sectors, means for effecting swinging of one of said gear sectors upon its axis, and rods each connecting the steering arm of one wheel to a gear sector, each of said rods connected with but one steering arm and but one gear sector and each pivotally connected to its associated gear sector at a point offset from the axis of pivotal support of the latter.

3. Steering mechanism for a vehicle having front and rear sets of steerable wheels each having a steering arm connected thereto, comprising a transverse shaft midway between said sets of wheels and carrying gear sectors at the opposite sides of the longitudinal center line of the vehicle, gear sectors pivotally supported, on axes offset from the axis of said shaft, at the opposite sides of the longitudinal center line of said vehicle and at opposite sides of the axis of said shaft and meshing with said first mentioned gear sectors, means for effecting swinging of one of said gear sectors upon its axis, and rods each connecting the steering arm of one wheel to a gear sector, each of said rods connected with but one arm and but one gear sector.

4. Steering mechanism for a vehicle having front and rear sets of steerable wheels each having a steering arm connected thereto, comprising a transverse shaft midway between said sets of wheels and carrying in rigid relation thereto gear sectors at the opposite sides of the longitudinal center line of the vehicle, gear sectors pivotally supported, on axes offset from the axis of said shaft, at the opposite sides of the longitudinal center line of said vehicle and at the opposite sides of said shaft and meshing with said first mentioned gear sectors, means for effecting swinging of one of said gear sectors upon its axis, and rods each connecting the steering arm of one wheel to a gear sector, said rods each pivotally connected, at a point offset from the pivot axis of the sector with which it is connected, with such sector.

5. Steering mechanism for a vehicle having front and rear sets of steerable wheels each having a steering arm connected thereto, comprising a transverse shaft carrying in rigid relation thereto gear sectors at the opposite sides of the longitudinal center line of the vehicle and extending in opposite directions from each other with respect to said shaft, gear sectors pivotally supported, on axes offset from the axis of said shafts, at the opposite sides of the longitudinal center line of said vehicle and meshing with said first mentioned gear sectors, means for effecting swinging of one of said gear sectors upon its axis, and rods each individual to one steering arm and one gear sector for connecting the steering arms of the several wheels each to a different gear sector.

6. Steering mechanism for a vehicle having front and rear sets of steerable wheels each having a steering arm connected thereto, comprising a transverse shaft carrying in non-rotative relation thereto gear sectors at the opposite sides of the longitudinal center line of the vehicle and extending in opposite directions from each other with respect to said shaft, gear sectors pivotally supported, on axes offset from the axis of said shaft, at the opposite sides of the longitudinal center line of said vehicle and meshing with said first mentioned gear sectors, means for effecting swinging of one of said gear sectors upon its axis, and rods each connecting one steering arm and one gear sector, each rod connecting the steering arm with which it is connected to the gear sector nearest to that wheel with which such steering arm is connected.

7. Steering mechanism for a vehicle having front and rear sets of steerable wheels each having a steering arm connected thereto, comprising a transverse shaft carrying in rigid relation thereto gear sectors at the opposite sides of the longitudinal center line of the vehicle, gear sectors pivotally supported, on axes offset from the axis of said shaft, at the opposite sides of the longitudinal center line of said vehicle and meshing with said first mentioned gear sectors, means for effecting swinging of one of said gear sectors upon its axis including a cylinder and piston mechanism having a pivotal connection with such sector at such a point thereon that a line connecting the pivotal axis of such sector and said point make a right angle with the axis of said cylinder and piston mechanism when the piston thereof is in mid stroke position, and rods connecting the several steering arms and sectors, each rod connecting the steering arm of one wheel to one gear sector whereby steering of each wheel is effected by a single sector.

8. Steering mechanism for a vehicle having front and rear sets of steerable wheels each having a steering arm connected thereto, comprising a transverse shaft midway between said sets of wheels carrying gear sectors in non-rotative relation thereto at the opposite sides of the longitudinal center line of the vehicle and extending in opposite directions from each other with respect to said shaft, other gear sectors pivotally supported, on axes offset from the axis of said shaft, at the opposite sides of the longitudinal center line of said vehicle and meshing with said first mentioned gear sectors, means for effecting swinging of one of said gear sectors upon its axis, relatively shorter rods connecting said other gear sectors with the steering arms of the wheels which are closest to said other gear sectors, and relatively longer rods connecting the first mentioned gear sectors to the steering arms of the other wheels.

9. Steering mechanism for a vehicle having front and rear sets of steerable wheels each having a steering arm connected thereto, comprising a transverse shaft midway between said sets of wheels carrying in non-rotative relation thereto gear sectors at the opposite sides of the longitudinal center line of the vehicle and extending in opposite directions from each other with respect to said shaft, gear sectors pivotally supported, on axes offset from the axis of said shaft, at the opposite sides of the longitudinal center line of said vehicle and meshing with said first mentioned gear sectors, means for effecting swinging of one of said gear sectors upon its axis, relatively longer rods connecting the sectors carried by said shaft with the steering arms of certain of the wheels, and relatively shorter rods connecting the other gear sectors to the steering arms of the wheels which are nearest to them, all of said rods having pivotal connections with the gear sectors which they respectively connect to steering arms at points which, in the straight-ahead steering position of the wheels, are at the far sides of the pivot axes of said sectors from such wheels.

10. Steering mechanism for a vehicle having front and rear sets of steerable wheels each having a steering arm connected thereto, comprising a transverse shaft carrying, rigidly fixed thereto, gear sectors at the opposite sides of the center line of the vehicle, gear sectors pivotally supported at the opposite sides of the center line of said vehicle and meshing with said first mentioned gear sectors, means for effecting turning of said shaft on its axis, and rods each connecting the steering arm of one wheel to a gear sector and pivotally connected to such gear sector at a point offset from the axis of turning of the latter.

11. Steering mechanism for a vehicle having front and rear sets of steerable wheels each having a steering arm connected thereto, comprising a transverse shaft carrying, in non-rotative relation thereto, gear elements thereon, gear elements pivotally supported by said vehicle in position to mesh with said first mentioned gear elements, means for imparting a turning force to one of said gear elements, and rods each connecting the steering arm of one wheel to a gear element, said rods each pivotally connected to the gear element which it connects with a steering arm on an axis which is offset from the axis of turning movement of such gear element and which travels around the latter axis as said gear element is rotated.

12. Steering mechanism for a vehicle having a material supporting bottom and having front and rear sets of axle supported steerable wheels each having a steering arm connected thereto, comprising a transverse shaft arranged below said bottom and carrying, in fixed relation thereto, gear elements, said transverse shaft arranged substantially midway between the front and rear wheels, gear elements pivotally mounted on said vehicle in meshing relation with said first mentioned gear elements and having their axes of rotation higher than the axis of rotation of said shaft, relatively long rods connecting the gear elements on said shaft with the steering arms of two of said wheels, and relatively short rods connecting the steering arms of the other two of said wheels with said second mentioned gear elements.

13. Steering mechanism for a vehicle having a material supporting bottom and having front and rear sets of axle supported steerable wheels each having a steering arm connected thereto, comprising a transverse shaft arranged below said bottom and carrying in non-rotative relation thereto gear elements, said transverse shaft arranged substantially midway between the front and rear wheels, gear elements pivotally mounted on said vehicle in meshing relation with said first mentioned gear elements and having their axes of rotation higher than the axis of rotation of said shaft, rods connecting the steering arms of certain of the wheels with the gear elements on said shaft and having connection with such gear elements at points on the latter which, in the straight-ahead positions of said wheels, are at the opposite sides of said shaft from said wheels, and rods connecting the steering arms of the other two of said wheels with said second mentioned gear elements.

14. Steering mechanism for a vehicle having a material supporting bottom and having front and rear sets of axle supported steerable wheels each having a steering arm connected thereto, comprising a transverse shaft arranged below said material supporting bottom and carrying, in rigid relation thereto, gear elements, said transverse shaft arranged substantially midway between the front and rear wheels, gear elements pivotally mounted on said vehicle in meshing relation with said first mentioned gear elements and having their axes of rotation higher than the axis of rotation of said shaft, relatively long rods connecting the gear elements on said shaft with the steering arms of two of said wheels, and relatively short rods connecting the steering arms of the other two of said wheels with said second mentioned gear elements, said rods having pivotal connections with said gear elements at points on the latter so disposed as to cause the wheels at the side of the vehicle which will be the inside in going around a curve to be angled more than the other pair of wheels.

15. Steering mechanism for a vehicle having front and rear sets of steerable wheels each having a steering arm connected thereto comprising a single transverse shaft providing a pair of angularly related crank arms fixed thereto and spaced therealong, other crank arms mounted to swing on axes laterally offset from the axis of said shaft, said other crank arms arranged one adjacent each of said first pair and connected with the latter to be swung as the latter are swung, means for turning said shaft, and rods one connecting each crank arm to a steering arm, each crank arm and each steering arm having but one rod connected thereto.

16. Steering mechanism for a vehicle having front and rear sets of steerable wheels each having a steering arm connected thereto comprising a transverse shaft providing a pair of angularly related crank arm equivalents spaced therealong and rigidly fixed thereto, other crank arm equivalents one adjacent each of said first pair and connected with the latter to be swung as the latter are swung, said last recited crank arm equivalents having means for supporting them for turning on axes laterally offset from the axis of said shaft, means for turning said shaft, and rods one connecting each crank arm equivalent to a steering arm, said rods pivotally connected to the crank arm equivalents which they respectively connect to steering arms on axes which are moved bodily as said crank arm equivalents are swung.

17. Steering mechanism for a vehicle having front and rear sets of steerable wheels each having a steering arm connected thereto comprising a transverse shaft providing in rigid relation thereto a pair of angularly related crank arms spaced therealong, other crank arms one adjacent each of said first pair and connected with the latter to be swung, on an axis offset from the axis of said shaft, as the first crank arms are swung, means for turning said shaft, and rods each individual to one steering arm and to one crank arm connecting each crank arm to a steering arm, each rod connected, in the straight-ahead steering position of the wheels, with the crank arm which it connects with a steering arm at a point at the far side of the swing axis of such crank arm from such steering arm.

18. Steering mechanism for a vehicle having front and rear pairs of steerable wheels, each wheel having a steering arm connected thereto, including a transverse shaft having fixed thereto, at opposite sides of the longitudinal center line of the vehicle, gear elements, other gear elements pivotally mounted adjacent said shaft and one meshing with each of the gear elements on the latter, said other gear elements disposed at opposite sides of said shaft, said gear elements each having thereon a pivot connection for a drag link, and drag links, one for each such pivot connection, leading therefrom to the steering arms of the wheels which are respectively nearest to said gear elements, said pivot connections so positioned on said gear elements that the movements of said drag links are greater as said pivot connections move apart from their mean positions than when they move towards each other from such mean positions.

19. Steering mechanism for a vehicle having front and rear pairs of steerable wheels, each having a steering arm connected thereto, comprising a transverse shaft carrying gear elements fixed thereto at opposite sides of the longitudinal center line of the vehicle, gear elements pivotally supported on axes offset from the axis of said shaft and constantly meshing with said first mentioned gear elements, means for effecting concurrent swinging of said gear elements upon their axes, and four drag links each pivotally connected with the steering arm of one wheel and with one gear element, each of said drag links connected with but one steering arm and one gear element.

20. Steering mechanism for a vehicle having front and rear sets of steerable wheels, each having a steering arm connected to it, each of said steering arms having upon it a pivot for connection with a steering rod and each of said pivots being nearer to the more adjacent end of the vehicle than is the vertical plane in which the axis of rotation of its associated wheel lies when such plane is perpendiuclar to the central longitudinal plane of the vehicle, said steering mechanism comprising a transverse shaft providing a pair of angularly related crank arm equivalents spaced therealong and rigidly fixed thereto, other crank arm equivalents one adjacent each of said first pair and connected with the latter to be swung as the latter are swung, said last recited crank arm equivalents having means for supporting them for turning on axes laterally offset from the axis of the shaft, means for turning said shaft, and steering rods connecting each crank arm equivalent to a pivot upon a steering arm.

21. Steering mechanism for a vehicle having front and rear sets of steerable wheels, each having a steering arm connected to it, said steering mechanism comprising a transverse shaft providing a pair of angularly related crank arms spaced therealong and rigidly fixed thereto, other crank arms one adjacent each of said first pair and connected with the latter to be swung as the latter are swung, said last recited crank arms having means for supporting them for turning on axes laterally offset from the axis of the shaft, means for turning said shaft, and rods one connecting each crank arm to a steering arm, each of said rods, when the wheel whose steering it controls is in straight ahead steering position, pivotally connected to the crank arm which it connects to a steering arm on an axis which lies at the opposite side from said steering arm of a vertical plane which includes the axis of rotation of such crank arm, and pivotally connected to said steering arm on a pivot which is nearer the more proximate end of the vehicle than it would be if it lay directly over the axis of rotation of the wheel which said steering arm steers.

22. Steering means for a vehicle having front and rear sets of steerable wheels and each having a steering arm connected thereto comprising a transverse shaft between the sets of wheels carrying in non-rotative relation to it gear sectors at the opposite sides of the longitudinal center line of the vehicle and extending in opposite directions from each other with respect to the shaft, gear sectors pivotally supported on axes offset from but parallel to the axis of said shaft at the opposite sides of the longitudinal center line of the vehicle and meshing with the first mentioned gear sectors, means for effecting swing of one of the gear sectors upon its axis, rods connecting the sectors carried by the shaft with the steering arms of certain of the wheels, and other rods connecting the other sectors with the steering arms of the wheels which are nearest to them, said steering arms so angularly related to the axes of rotation of the wheels which they respectively steer that, in the straight ahead position of the wheels, the connections of all of said rods with said steering arms are nearer the more adjacent ends of the vehicle than are the axes of rotation of the wheels.

VICTOR I. DUDLEY.

REFERENCES CITED

The following references are of record in the file of this patent:

UNITED STATES PATENTS

| Number | Name | Date |
|---|---|---|
| 154,846 | Cowles | Sept. 8, 1874 |
| 872,820 | Johnson | Dec. 3, 1907 |
| 1,069,720 | Peterson | Aug. 12, 1913 |
| 1,255,775 | Mueller | Feb. 5, 1918 |